March 11, 1941.  G. PRAGER  2,234,652
CAMERA SHUTTER OPERATING DEVICE
Filed May 24, 1939  2 Sheets-Sheet 1
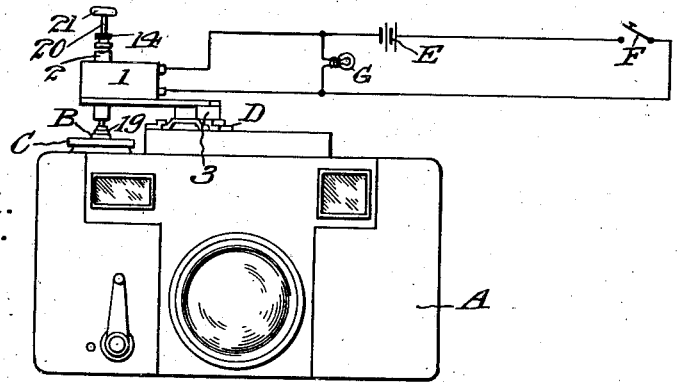
Fig. 1.
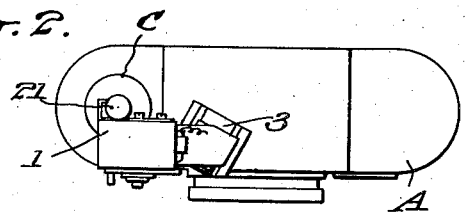
Fig. 2.
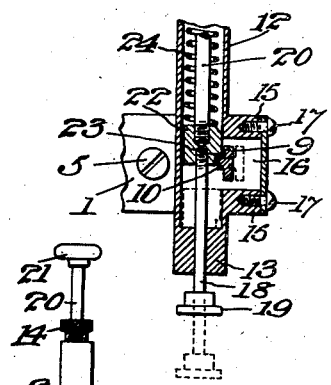
Fig. 5.
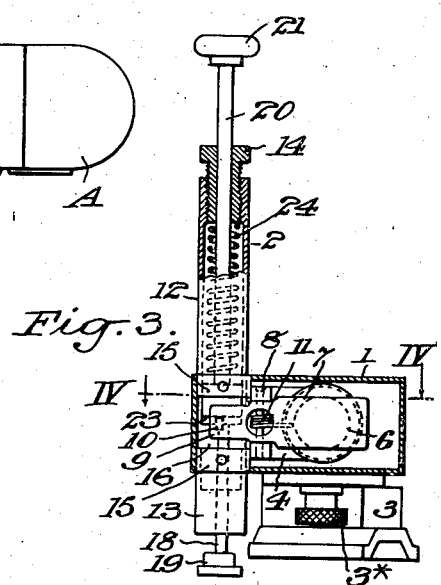
Fig. 3.
Fig. 4.
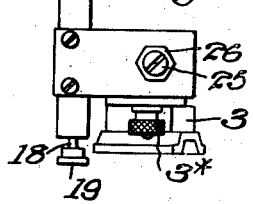
Fig. 6.
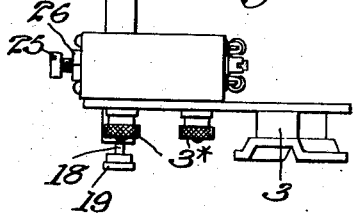
Fig. 7.
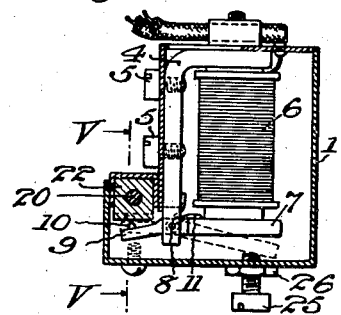
INVENTOR
Gustav Prager
BY Brown & Seward
ATTORNEYS March 11, 1941.　　　　G. PRAGER　　　　2,234,652
CAMERA SHUTTER OPERATING DEVICE
Filed May 24, 1939　　　2 Sheets-Sheet 2
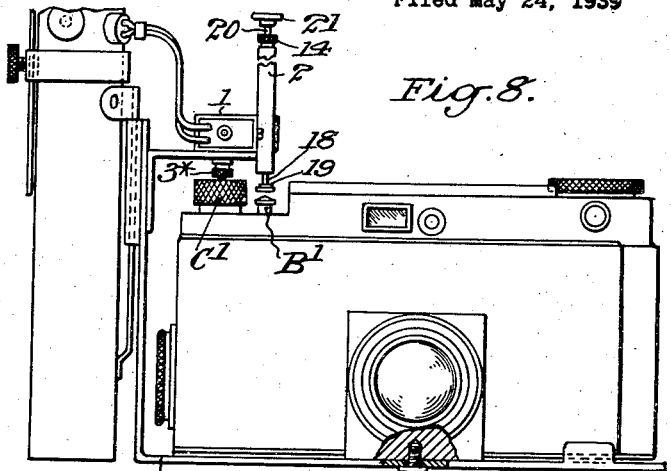
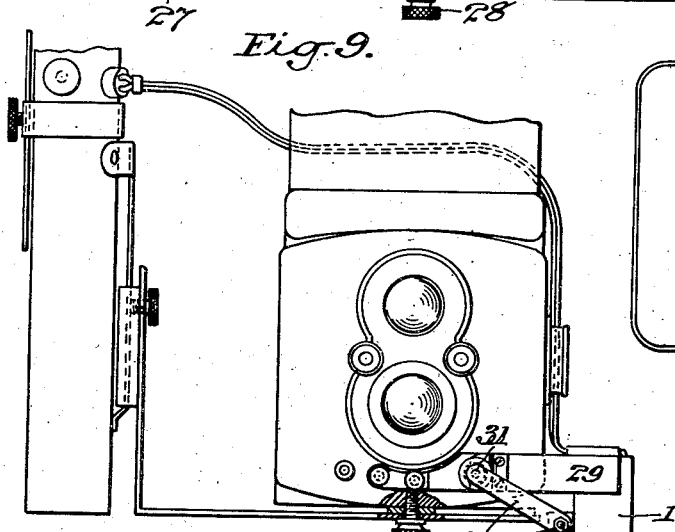
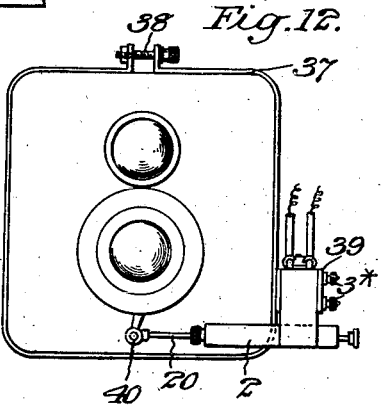
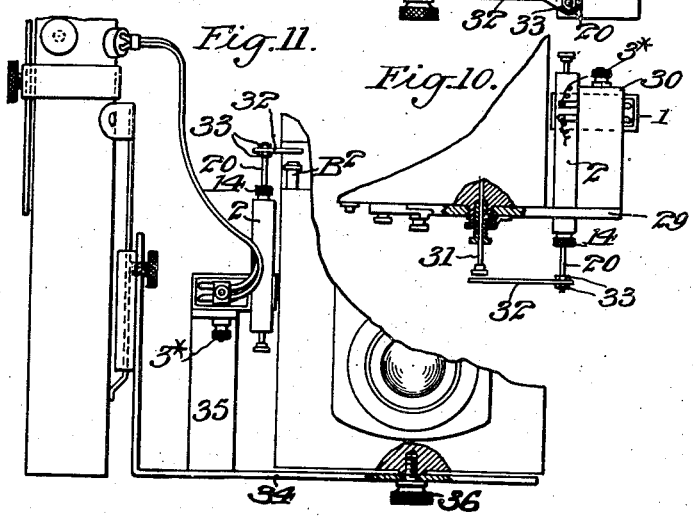
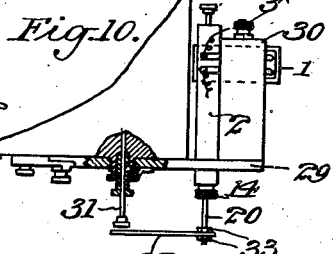
INVENTOR
Gustav Prager
BY
Brown & Seward
ATTORNEYS Patented Mar. 11, 1941

2,234,652

UNITED STATES PATENT OFFICE 2,234,652

CAMERA SHUTTER OPERATING DEVICE

Gustav Prager, New York, N. Y., assignor to Abbey Photo Corporation, New York, N. Y., a corporation of New York Application May 24, 1939, Serial No. 275,436

8 Claims. (Cl. 74—2)

This invention relates to a camera shutter operating device, particularly of the type used to secure synchronization of the shutter opening with the peak of illumination from an electrically operated flash bulb.

An object of the invention is to provide such a device for use on cameras wherein the shutter operation is controlled from a body release remote from the shutter.

Another object of the invention is to provide such a device which may be adapted to use on a wide variety of camera models.

A further object of the invention is to provide such a device in which the body release is actuated mechanically by electrically operated means.

A still further object of the invention is to provide such a device in which the speed of operation may be adjusted to secure perfect synchronization with the peak of illumination from a flash bulb; the shutter operating device and the flash bulb being operated simultaneously from a single source of electric current.

Another object of the invention is to provide certain improvements in the form, construction and arrangement of the several parts whereby the above named and other objects may effectively be attained.

While some of the high speed cameras now in wide use are intended to be operated solely or chiefly by a shutter trigger adjacent the lens opening, many types of cameras, particularly in the smaller sizes, are arranged with linkage between the shutter and a body release located at some other convenient point on the camera. This tendency to locate the body release at various points has presented a difficult problem in connection with the construction and mounting of synchronizing devices, and the present invention represents a very effective solution for this problem.

A practical embodiment of the invention is represented in the accompanying drawings, in which Fig. 1 represents a front elevation of a small high speed camera having a synchronizing device mounted thereon, part of the latter being broken away, and the electric circuit being indicated diagrammatically;

Fig. 2 represents a top plan view of the camera and synchronizing device shown in Fig. 1.

Fig. 3 represents a vertical section through the synchronizing device, on an enlarged scale.

Fig. 4 represents a horizontal section through the device shown in Fig. 3, taken at the line IV—IV looking in the direction of the arrows.

Fig. 5 represents a detail vertical section along the line V—V of Fig. 4, looking in the direction of the arrows, this section being at right angles to the section shown in Fig. 3.

Fig. 6 represents an end elevation of the device shown in approximately its normal size.

Fig. 7 represents a side elevation of the device as viewed from right to left of Fig. 6.

Figs. 8, 9, 10, 11 and 12 show the applicability of the device to several well known types of cameras in which the body release is in a different position from that shown in Figs. 1 and 2; Fig. 10 being a detail plan view, partly in section, of the mounting arrangement shown in Fig. 9.

Referring to the drawings and particularly Figs. 1 to 7 inclusive, a high speed camera of the "Contax" type is shown at A. In this camera the shutter is operated by a body release B in the center of a winding and setting knob C, on the top of the camera adjacent one end thereof, the body release being arranged for actuation by downward pressure to release the shutter. The camera is also provided with a synchronizer mounting shoe D permanently secured to the top of the camera.

The shutter operating device or synchronizer comprises a coil housing I and a plunger housing 2, together with a mounting support 3 to which the housing is fastened by means of a thumb screw 3*. An L shaped frame 4 is secured to one side of the coil housing by screws 5 and carries an electro-magnet 6 the axis of which extends generally parallel to the long side of the frame. An armature 7 is pivotally mounted at 8 in one end of the frame 4, the armature being provided with an extension 9 having a lug 10 arranged to cooperate with the plunger assembly, as will be described. A spring 11 adjacent the pivot point 8 is arranged to urge the armature away from the core of the electro-magnet and to urge the extension 9 and lug 10 into plunger engaging position, as indicated in dotted lines in Fig. 4, to constitute a releasable lock.

The plunger housing 2 comprises an elongated shell portion 12 having its lower end closed by a permanently mounted bearing block 13 and its upper end threaded to receive a perforated adjusting screw 14. The shell 12 is provided with a lateral opening between projections 15 which form a chamber 16 within which the extension 9 of the armature can operate (Figs. 4 and 5). The plunger housing is secured to the coil housing by means of screws 17 passing through a wall of the coil housing into the projections 15. The block 14 is perforated to permit the passage of a lower plunger shaft 18 having a push button 19 threaded onto its lower end. The perforation in the screw 14 permits the passage of an upper plunger shaft 20 having a pull button 21 threaded onto its upper end. The inner ends of the shafts 18 and 20 are threaded into openings respectively in the bottom and top of a block 22 which has a sliding fit within the shell 12; and the block 22 may be provided with a shoulder 23 adapted to engage the lug 10 on the armature extension 9, as shown in Fig. 5. The plunger assembly is urged downwardly by an extension spring 24 surrounding the upper shaft 20 and bearing against the top of the block 22 and the bottom of the screw 14.

Adjustment of the device to vary the speed of its operation may be effected by means of the set screw 25 held in position by a lock nut 26, in order to vary the gap between the armature 7 and the core of the electro-magnet 6, as well as by adjustment of the screw 14 to vary the tension of the spring 24.

In the operation of the device when mounted on a camera as shown in Figs. 1 and 2, the plunger is raised by pulling upward on the button 21 until the lug 6 engages the shoulder 23 on the block 22, the lug being urged into engaging position by the spring 11. The electro-magnet 6 is connected in a circuit which includes a battery E and a switch F, so that when the switch is closed the electro-magnet moves the armature 7 from the dotted line position in Fig. 4 to the full line position, thus swinging the extension 9 and lug 10 out of plunger engaging position and permitting the spring 24 to force the plunger down toward its lowest position, indicated in dotted lines in Fig. 5. The push button 19 will thus be caused to actuate the body release B of the camera. In usual practice the operating circuit will include a flash bulb G connected in parallel with the synchronizing device so that the bulb will be set off while the synchronizing device opens the camera shutter at the instant the peak of illumination from the bulb is reached, this synchronization being achieved by suitable adjustment of the armature gap and the spring tension as described above.

When the synchronizing device is used in connection with cameras other than the type shown in Figs. 1 and 2 it may be necessary to mount the device in various other positions, as shown in Figs. 8, 9, 10, 11 and 12, and the adaptability of the device to these various types of cameras is a feature of considerable practical importance.

In Fig. 8 is shown a camera of the "Kodak Retina" type wherein the body release B¹ is adjacent the winding and setting knob C¹ but not within it. In this case the synchronizer may be mounted on a bracket 27 which passes around the camera and is secured by a thumb screw 28 adapted to engage the tripod socket in the bottom of the camera. The synchronizer is secured to a projecting portion of the bracket by means of the thumb screw 3*. The bracket 27 may also conveniently provide a support for a battery case and flash bulb of any appropriate type such as that shown in co-pending application Serial No. 260,718, filed March 9, 1939.

In Fig. 9 is shown the mounting of the device on a camera of the "Rolleiflex" type wherein the body release is located near the bottom of the face of the camera. In this case a bracket 29 is screwed directly onto the face of the camera, the bracket being formed with a rearwardly and downwardly extending L-shaped projection 30 to which the synchronizing device is secured by the thumb screw 3*. A push rod 31 is placed in the cable opening of the body release and the pull button 21 is removed from its plunger shaft 20, being replaced by a finger 32 mounted between lock nuts 33 so as to project to a point where it can engage the head of the plunger rod 31 as clearly shown in Figs. 9 and 10. When the device is operated from its set position the plunger shaft 20 pulls the finger 32 against the head of the rod 31, thereby operating the shutter of the camera. A separate bracket similar to that shown in Fig. 8 may be provided as shown in Fig. 9 for supporting the battery case and flash lamp.

In Fig. 11 is shown the mounting of the device on a camera of the "Ikoflex" type in which the body release B² is located at one corner of the top of the camera. In this case a bracket 34 having an upwardly and forwardly extending portion 35 is arranged to be secured by a thumb screw 36 to the tripod socket in the bottom of the camera, the synchronizer being secured to the portion 35 by a thumb screw 3*. As in the arrangement shown in Figs. 9 and 10 the pull button 21 is replaced by a finger 32 secured to the shaft 20 by lock nuts 33, the finger being arranged to project above the body release B² so that operation of the synchronizer will push down the body release. The bracket 34 may conveniently be extended to provide a support for the battery case and flash bulb referred to above.

In Fig. 12 is shown the mounting of the device on a camera of the "Rolleicord" type in which the whole face of the camera projects from the body thereof in order to form a shoulder which may conveniently be embraced by a strap bracket 37, the ends of which are drawn together by a nut and bolt 38 in a manner which will readily be understood. The bracket 37 is provided with an extension 39 adapted to embrace the synchronizing device which is secured thereto by means of thumb screws 3*. In connection with this camera the synchronizer acts directly upon the shutter setting and releasing trigger, over the end of which is fitted a cap 40 taking the place of the pull buttom 21 on the end of the plunger shaft 20. This arrangement is particularly convenient and desirable since a single motion (toward the left of Fig. 12) serves to set both the shutter mechanism and the synchronizing device, so that the operator need never wonder whether the shutter is properly set when the synchronizer is in operating position.

From the foregoing description it can readily be appreciated that the synchronizing device disclosed herein may be regarded as having almost universal applicability to the known types of small high speed cameras, the device being arranged to provide either a pushing action or a pulling action according to the requirements of each individual camera. With the foregoing facts understood, adaptations to other types of cameras may easily be worked out in accordance with the principles herein set forth. For example, a type of camera known as "Super Ikonta B" resembles in some respects the "Kodak Retina" shown in Fig. 8, insofar as the position of the body release is concerned; however in the "Super Ikonta B" the location of the finder permits mounting of the synchronizer in substantially the position shown in Figs. 1 and 2, instead of requiring use of a bracket as in Fig. 8.

It will be apparent that various changes may be made in the construction, form and arrangement of the several parts without departing from the spirit and scope of my invention, and hence I do not intend to be limited to the particular embodiment herein shown and described, but what I claim is:

1. A camera shutter operating device comprising, a plunger, means for moving the plunger to actuate a shutter release, movable means for holding the plunger in set position, an armature connected to said holding means, an electromagnet arranged to act on said armature for moving the holding means out of engagement with the plunger, and means for regulating the extent of movement of said armature.

2. A camera shutter operating device comprising, a plunger housing, a plunger slidable within said housing and having a pulling portion and a pushing portion projecting therefrom, each said portion being adapted to act on a shutter release, means for moving the plunger to actuate a shutter release, movable means for holding the plunger in set position, and electric means for moving the holding means out of plunger engaging position.

3. A camera shutter operating device comprising, a plunger housing, a plunger having a pulling portion projecting from one end of said housing, a pushing portion projecting from the other end thereof and a sliding portion fitted therein, each said portion being adapted to act on a shutter release, a spring arranged to urge the plunger toward shutter release actuating position, a movable lock arranged to engage said sliding portion for holding the plunger in set position, and electric means for moving the lock out of engagement with said sliding portion.

4. A camera shutter operating device comprising, a plunger having a portion adapted to act on a shutter release and a sliding portion, a spring arranged to urge the plunger toward shutter release actuating position, means for adjusting the spring to vary the speed of motion of the plunger, movable means for holding the plunger in set position, an armature operatively associated with said holding means, a supporting frame, said holding means and said armature being pivotally mounted in said frame, an electro-magnet also mounted on said frame and arranged to act on said armature for moving the holding means out of engagement with the plunger, and means for regulating the extent of movement of said armature.

5. A camera shutter operating device comprising, a plunger housing, a plunger having a portion projecting from said housing and adapted to act on a shutter release and a sliding portion fitted within the housing, a spring arranged to urge the plunger toward shutter release actuating position, movable means projecting through an opening in said housing for holding the plunger in set position, an armature operatively associated with said holding means, an L-shaped supporting frame, said holding means and said armature being pivotally mounted at the same point on one end of said frame, and an electromagnet mounted adjacent the other end of said frame and arranged to act on said armature for moving the holding means out of engagement with the plunger.

6. A device in accordance with claim 2 in which the pulling portion is provided with an element removably secured thereto and adapted to act on a shutter release.

7. A device in accordance with claim 2 in which the pulling portion is provided with a projecting finger adapted to act on a shutter release.

8. A device in accordance with claim 2 in which the pulling portion is provided with a projecting finger adapted to act on a body shutter release.

GUSTAV PRAGER.

DISCLAIMER 2,234,652.—*Gustav Prager*, New York, N. Y. CAMERA SHUTTER OPERATING DEVICE.
Patent dated March 11, 1941. Disclaimer filed July 23, 1942, by the assignee, *Abbey Photo Corporation*.

Hereby enters this disclaimer to claims 1 and 4 in said specification.

[*Official Gazette August 25, 1942.*]